(12) United States Patent
Charbonneau et al.

(10) Patent No.: US 9,021,838 B2
(45) Date of Patent: May 5, 2015

(54) SYSTEMS AND METHODS FOR GLASS MANUFACTURING

(75) Inventors: Mark William Charbonneau, Lakewood, CO (US); Aaron Morgan Huber, Castle Rock, CO (US); Jeffrey M. Shock, Castle Rock, CO (US); Harley Allen Borders, Centennial, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/268,130

(22) Filed: Oct. 7, 2011

(65) Prior Publication Data

US 2013/0086951 A1   Apr. 11, 2013

(51) Int. Cl.

| | |
|---|---|
| *C03B 5/235* | (2006.01) |
| *C03B 5/20* | (2006.01) |
| *C03B 7/06* | (2006.01) |
| *F23C 5/08* | (2006.01) |
| *F23D 14/22* | (2006.01) |
| *F23D 14/32* | (2006.01) |

(52) U.S. Cl.
CPC ............... *C03B 5/202* (2013.01); *C03B 5/2353* (2013.01); *C03B 5/2356* (2013.01); *C03B 7/06* (2013.01); *F23C 5/08* (2013.01); *F23D 14/22* (2013.01); *F23D 14/32* (2013.01); *Y02E 20/344* (2013.01)

(58) Field of Classification Search
CPC ...... C03B 5/2353; C03B 5/2356; C03B 5/237
USPC .......................................... 65/134.9, 346, 347
See application file for complete search history.

(56) References Cited

U.S. PATENT DOCUMENTS

| | | | |
|---|---|---|---|
| 1,716,433 | A | 6/1929 | Ellis |
| 2,174,533 | A | 10/1939 | See et al. |
| 2,118,479 | A | 1/1940 | McCaskey |
| 2,269,459 | A | 1/1942 | Kleist |
| 2,432,942 | A | 12/1947 | See et al. |
| 2,465,907 | A | 1/1948 | Slayter |
| 2,679,749 | A | 6/1954 | Poole |
| 2,718,096 | A | 9/1955 | Henry et al. |
| 2,773,545 | A | 12/1956 | Petersen |
| 2,781,756 | A | 2/1957 | Kobe |

(Continued)

FOREIGN PATENT DOCUMENTS

| | | |
|---|---|---|
| DE | 196 19 919 A1 | 8/1997 |
| DE | 100 29 983 C2 | 9/2003 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Cynthia Szewczyk
(74) *Attorney, Agent, or Firm* — Robert D. Touslee

(57) ABSTRACT

Submerged combustion systems and methods of use to produce glass. One system includes a submerged combustion melter having a roof, a floor, a wall structure connecting the roof and floor, and an outlet, the melter producing an initial foamy molten glass. One or more non-submerged auxiliary burners are positioned in the roof and/or wall structure and configured to deliver combustion products to impact at least a portion of the bubbles with sufficient force and/or heat to burst at least some of the bubbles and form a reduced foam molten glass.

12 Claims, 9 Drawing Sheets

(56) References Cited

U.S. PATENT DOCUMENTS

| | | |
|---|---|---|
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,622,007 A * | 11/1986 | Gitman ........................... 432/13 |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,039,787 A | 3/2000 | Edlinger |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |

(56) References Cited

U.S. PATENT DOCUMENTS

| | | |
|---|---|---|
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1* | 11/2002 | Jeanvoine et al. ............ 65/134.5 |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2009/0235695 A1* | 9/2009 | Pierrot et al. ............... 65/356 |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1* | 12/2010 | Watson et al. ............ 65/136.3 |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107917 A1 | 5/2011 | Galley et al. |
| 2011/0236846 A1 | 9/2011 | Rue et al. |
| 2011/0308280 A1* | 12/2011 | Huber ............................ 65/126 |

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 | 5/1921 |
| IT | 1208172 | 7/1989 |
| RO | 114827 | 7/1999 |
| WO | 9855411 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

(56) References Cited

OTHER PUBLICATIONS

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

* cited by examiner

SYSTEMS AND METHODS FOR GLASS MANUFACTURING

CROSS-REFERENCE TO RELATED APPLICATIONS

This application is related to assignee's U.S. non-provisional patent application Ser. No. 12/817,754, filed Jun. 17, 2010; Ser. No. 12/888,970, filed Sep. 23, 2010; and Ser. Nos. 13/267,990; 13/268,028; 13/268,065; and 13/268,098, all filed Oct. 7, 2011, all of which are incorporated herein by reference.

BACKGROUND INFORMATION

1. Technical Field

The present disclosure relates generally to the field of combustion furnaces and methods of use to produce glass, and more specifically to systems and methods for reducing foam or its impact during manufacture of glass using submerged combustion melters.

2. Background Art

Submerged combustion melting (SCM) involves melting glass batch materials to produce molten glass by passing oxygen, oxygen-air mixtures or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence. However, one drawback to submerged combustion is the tendency of the molten glass to foam. The foam may stabilize in a top layer when the molten mass is routed through conditioning and/or distribution channels/systems downstream of the submerged combustion melter. The foam layer may impede the ability to apply heat to the glass using combustion burners, and may also impede the rate at which further bubbles in the melt rise and thus effect expulsion of the bubbles and mass flow rate of the melt in the channels. In extreme cases, the foam generated may interfere with the traditional energy application methods employed, which may cause systems to require shutdown, maintenance and may result in a process upset. Attempts to reduce the foam problem through process adjustments have not met with complete success in reducing foam to an acceptable amount.

It would be an advance in the glass manufacturing art if foam could be reduced, or the effect of the foam reduced, during glass manufactured using a submerged combustion melter and methods.

SUMMARY

In accordance with the present disclosure, systems and methods are described which reduce or overcome one or more of the above problems.

A first aspect of the disclosure is a system comprising:

a submerged combustion melter comprising a floor, a roof, and a wall structure connecting the floor and roof, the melter comprising one or more submerged combustion burners and a molten glass outlet, the melter configured to produce an initial foamy molten glass having a density and comprising bubbles, at least some of the bubbles forming a bubble layer on top of the foamy molten glass; and one or more non-submerged auxiliary burners positioned in the roof and/or wall structure and configured to deliver their combustion products to impact at least a portion of the bubbles in the bubble layer with sufficient force and/or heat to burst at least some of the bubbles and form a reduced foam molten glass.

A second aspect of the disclosure is a system comprising:

a submerged combustion melter comprising a floor, a roof, and a wall structure connecting the floor and roof, the melter comprising one or more submerged combustion burners and a molten glass outlet, the melter configured to produce an initial foamy molten glass having a density and comprising bubbles, at least some of the bubbles forming a bubble layer on top of the foamy molten glass; and a downstream component fluidly connected to the melter for accepting at least a portion of the foamy molten glass, the downstream component comprising a flow channel, a downstream component roof, and a downstream component wall structure connecting the downstream component flow channel and downstream component roof, the downstream component comprising one or more non-submerged downstream component auxiliary burners positioned in the downstream component roof and/or downstream component wall structure and configured to deliver their combustion products to impact at least a portion of bubbles in the bubble layer on the foamy molten glass with sufficient force and/or heat to burst at least some of the bubbles.

A third aspect of the disclosure is a system comprising:

a submerged combustion melter comprising a floor, a roof, and a wall structure connecting the floor and roof, the melter comprising one or more submerged combustion burners and a molten glass outlet, the melter configured to produce an initial foamy molten glass having a density and comprising bubbles, at least some of the bubbles forming a bubble layer on top of the foamy molten glass;

one or more non-submerged auxiliary burners positioned in the roof and/or wall structure and configured to deliver combustion products to impact at least a portion of the bubbles in the bubble layer with sufficient force and heat to burst at least some of the bubbles and form a reduced foam molten glass; and a downstream component fluidly connected to the melter for accepting at least a portion of the reduced foam molten glass, the downstream component comprising a flow channel, a downstream component roof, and a downstream component wall structure connecting the downstream component flow channel and downstream component roof, the downstream component comprising one or more non-submerged downstream component auxiliary burners positioned in the downstream component roof and/or downstream component wall structure and configured to deliver their combustion products to impact at least a portion of bubbles remaining in the bubble layer on the reduced foam molten glass with sufficient force and/or heat to burst at least some of the remaining bubbles.

A fourth aspect of the disclosure is a method comprising:

melting glass-forming materials in a submerged combustion melter comprising a floor, a roof, and a wall structure connecting the floor and roof, the melter comprising one or more submerged combustion burners and a molten glass outlet;

producing an initial foamy molten glass having a density and comprising bubbles, at least some of the bubbles forming a bubble layer on top of the foamy molten glass; and routing combustion products from one or more non-submerged auxiliary burners positioned in the roof and/or wall structure to impact at least a portion of the bubbles in the bubble layer with sufficient force and/or heat to burst at least some of the bubbles and form a reduced foam molten glass.

A fifth aspect of the disclosure is a method comprising:

melting glass-forming materials in a submerged combustion melter comprising a floor, a roof, and a wall structure connecting the floor and roof, the melter comprising one or more submerged combustion burners and a molten glass outlet;

producing an initial foamy molten glass having a density and comprising bubbles, at least some of the bubbles forming a bubble layer on top of the foamy molten glass; and routing at least a portion of the foamy molten glass and bubble layer into a downstream component fluidly connected to the melter, the downstream component comprising a flow channel, a downstream component roof, and a downstream component wall structure connecting the downstream component flow channel and downstream component roof; and routing combustion products from at least one downstream component non-submerged auxiliary burners positioned in the downstream component roof and/or downstream component wall structure to impact at least a portion of bubbles in the bubble layer on the foamy molten glass with sufficient force and/or heat to burst at least some of the bubbles.

A sixth aspect of the disclosure is a method comprising:

melting glass-forming materials in a submerged combustion melter comprising a floor, a roof, and a wall structure connecting the floor and roof, the melter comprising one or more submerged combustion burners and a molten glass outlet;

producing an initial foamy molten glass having a density and comprising bubbles, at least some of the bubbles forming a bubble layer on top of the foamy molten glass;

routing combustion products from one or more non-submerged auxiliary burners positioned in the roof and/or wall structure to impact at least a portion of the bubbles in the bubble layer with sufficient force and/or heat to burst at least some of the bubbles and form a reduced foam molten glass; and routing at least a portion of the reduced foam molten glass to a downstream component fluidly connected to the melter, the downstream component comprising a flow channel, a downstream component roof, and a downstream component wall structure connecting the downstream component flow channel and downstream component roof; and routing combustion products from one or more non-submerged downstream component auxiliary burners positioned in the downstream component roof and/or downstream component wall structure to impact at least a portion of bubbles remaining in the bubble layer on the reduced foam molten glass with sufficient force and/or heat to burst at least some of the remaining bubbles.

Systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1A:
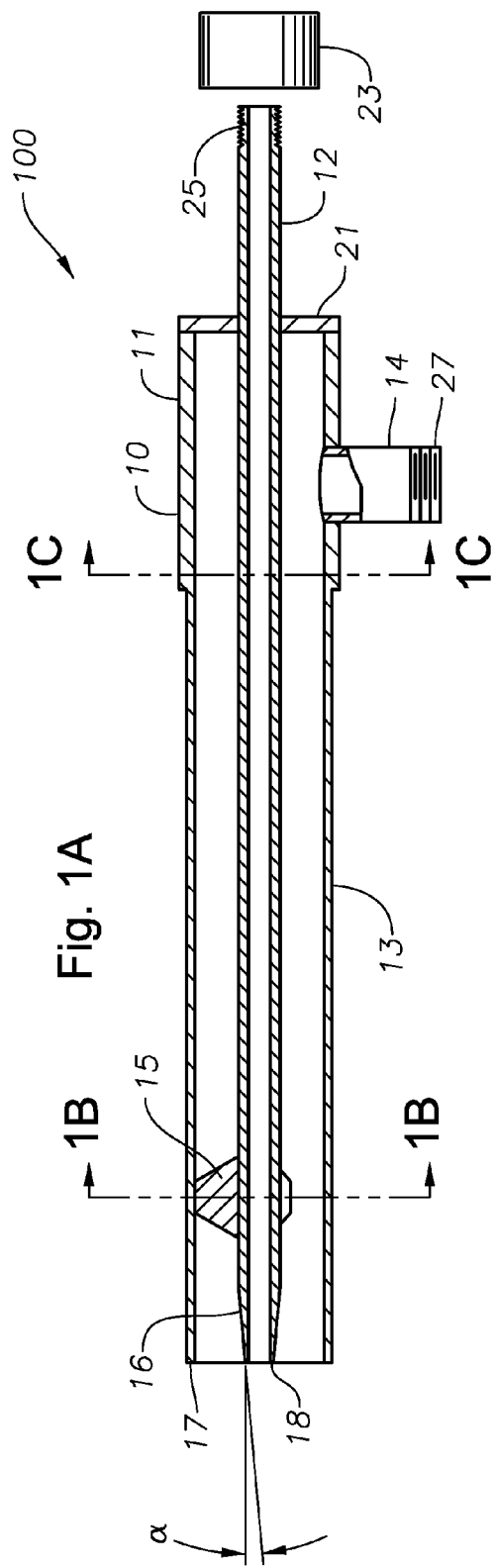
FIG. 1A is a schematic cross-sectional view of one embodiment of an auxiliary burner useful in systems and methods of this disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to submerged combustion is the tendency of the molten glass to foam, either from glass-forming reactions, combustion products, or both. The foam may stabilize in a top layer when the molten mass is routed through equipment downstream of the submerged combustion melter, such as forehearths, conditioning channels, distribution channels, and the like. The foam layer may impede the ability to apply heat to the glass using combustion burners in the melter and in such downstream equipment, and may also impede the rate at which further bubbles in the melt rise and thus effect expulsion of the bubbles and mass flow rate of the melt in the channels. In extreme cases, the foam generated may interfere with the traditional energy application methods employed, which may cause systems to require shutdown, maintenance and may result in a process upset. Attempts to reduce the foam problem through process adjustments have not met with complete success in reducing foam to an acceptable amount.

Applicants have discovered systems and methods that may reduce or eliminate such problems.

Various terms are used throughout this disclosure. "Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner).

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, ovoid, and the like. Gas in the gas-filled bubbles may comprise oxygen or other oxidants, nitrogen, argon, noble gases, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

"Oxidant" as used herein includes air and gases having the same molar concentration of oxygen as air, oxygen-enriched air (air having oxygen concentration of oxygen greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Conduits used in burners useful in the systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the refractory cooled panels, melter and channel refractory liners, and refractory burner blocks (if used) are fused zirconia ($ZrO_2$), fused cast AZS (alumina-zirconia-silica), rebonded AZS, or fused cast alumina ($Al_2O_3$). The burner and melter geometry, and type of glass to be produced may dictate the choice of a particular material, among other parameters.

The terms "cooled" and "coolant" may include use of any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain fluid-cooled auxiliary burners useful in systems and methods of this disclosure may include first and second concentric conduits, the first conduit fluidly connected at one end to a source of fuel, the second conduit fluidly connected to a source of oxidant, and a third substantially concentric conduit comprising a first end, a second end, and an internal surface, the internal surface of the third conduit forming, with an exterior surface of the second conduit, a secondary annulus external to a primary annulus between the first and second conduits. The first end of the third conduit may extend beyond the first end of the second conduit, the first end of the second conduit may extend beyond the first end of the first conduit, and the secondary annulus may be capped by an end cap connecting the first end of the second conduit and the first end of the third conduit.

In certain systems one or more of the non-submerged auxiliary burners may comprise a fuel inlet conduit having an exit nozzle, the conduit and nozzle inserted into a cavity of a ceramic burner block, the ceramic burner block in turn inserted into either the roof or the wall structure, or both the roof and wall structure.

In certain systems, one or more of the non-submerged auxiliary burners may be adjustable with respect to direction of flow of the combustion products. Adjustment may be via automatic, semi-automatic, or manual control. Certain system embodiments may comprise an auxiliary burner mount that mounts the auxiliary burner in the wall structure or roof comprising a refractory, or refractory-lined ball joint. Other burner mounts may comprise rails mounted in slots in the wall or roof. In yet other embodiments the auxiliary burners may be mounted outside of the melter or downstream component, on supports that allow adjustment of the combustion products flow direction. Useable supports include those comprising ball joints, cradles, rails, and the like.

Certain systems may comprise a downstream component fluidly connected to the melter for accepting at least a portion of the reduced foam molten glass, the downstream component comprising a flow channel, a downstream component roof, and a downstream component wall structure connecting the flow channel and downstream component roof. Certain systems may comprise one or more non-submerged downstream component auxiliary burners positioned in the downstream component roof and/or downstream component wall structure and configured to deliver their combustion products to impact at least a portion of bubbles remaining in the bubble layer on the reduced foam molten glass flowing through the downstream component, with sufficient force and/or heat to burst at least some of the remaining bubbles.

In certain systems at least one of the downstream component auxiliary burners may be adjustable with respect to direction of flow of the combustion products from the downstream component auxiliary burner.

Certain systems may comprise one or more downstream component auxiliary burners protruding through the wall structure and one or more auxiliary burners protruding through the roof of the downstream component.

In certain systems and methods the auxiliary burners in the melter and/or the auxiliary burners in the downstream component may be configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). The fuel and oxidant velocities may be the same or different in a given burner, and from burner to burner.

In certain systems and methods the downstream component may be selected from the group consisting of a distribution channel, a conditioning channel, and a forehearth.

Certain system and method embodiments of this disclosure may include submerged combustion melters comprising fluid-cooled panels. In yet other embodiments a feed slot may be provided that may be covered and integral with a fluid-cooled panel of a wall of the melter, such as disclosed in assignee's co-pending U.S. patent application Ser. No. 12/888,970, filed Sep. 23, 2010. In certain other embodiments, the slot may be integral with an exhaust port or roof of the melter. In certain embodiments, the slot may comprise one or more hinged doors or panels. In certain other embodiments the slot may comprise one or more sliding doors or panels. Certain embodiments may comprise both hinged and sliding doors or panels. The hinged and sliding doors may be water cooled, or cooled by other fluids.

In certain system and method embodiments, he submerged combustion melter may include one or more submerged combustion burners comprising one or more oxy-fuel combustion burners, such as described in assignee's co-pending U.S. patent application Ser. No. 13/268,028, filed Oct. 7, 2011.

Certain system and method embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, and combinations thereof, and may employ a control algorithm to control combustion temperature based on one or more of these input parameters.

Certain system and method embodiments may comprise using vibration and/or oscillation of the submerged combustion melter to predict melt viscosity and/or other properties of the initial foamy melt emanating from the melter, as disclosed in assignee's co-pending U.S. patent application Ser. No. 13/268,065, filed Oct. 7, 2011.

Certain other systems and methods may comprise using a submerged combustion melter comprising a large diameter exhaust port connecting to a large diameter chamber positioned between the melting chamber and an exhaust stack, as disclosed in assignee's co-pending U.S. patent application Ser. No. 13/268,098, filed Oct. 7, 2011. Certain melters of this type may be devoid of a sump.

Yet other systems and methods may include a cooling and annealing lehr downstream of the melter outlet, the lehr having an inlet and an outlet, and a transport apparatus allowing movement of the initial foamy molten glass through the lehr to a processing apparatus, as described in assignee's co-pending U.S. patent application Ser. No. 13/267,990, filed Oct. 7, 2011. Certain systems and methods may route a denser flow of molten glass to a production apparatus for manufacturing dense glass products, the production apparatus selected from the group consisting of continuous fiber production apparatus, discontinuous fiber production apparatus, and glass shaping apparatus.

Specific non-limiting system and method embodiments in accordance with the present disclosure will now be presented in conjunction with FIGS. 1-10. The same numerals are used for the same or similar features in the various figures. In the views illustrated in FIGS. 1-7, it will be understood in each case that the figures are schematic in nature, and certain conventional features are not illustrated in order to illustrate more clearly the key features of each embodiment.

Figure 1B:
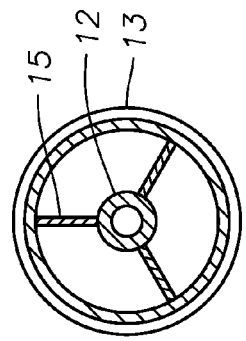
FIGS. 1B and 1C are schematic cross-sectional views of the auxiliary burner of FIG. 1A along the lines A-A and B-B, respectively.
Figure 1C:
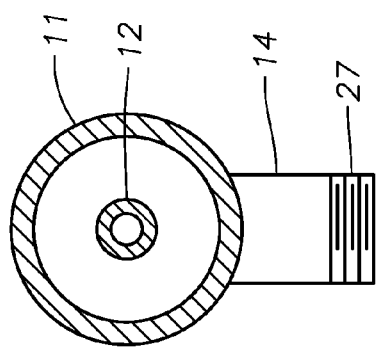

FIG. 1A is a schematic, partially exploded cross-sectional view of one embodiment 100 of an auxiliary burner useful in systems and methods of this disclosure. FIGS. 1B and 1C are schematic cross-sectional views of auxiliary burner 100 of FIG. 1A along the lines 1B-1B and 1C-1C, respectively. Auxiliary burner embodiment 100 includes an oxidant conduit 10 having a large outer diameter end 11 and an exit end 17, as well as a smaller outer diameter portion 13. An inner concentric fuel conduit 12 is provided having a fuel exit end 18, and an inlet end 25 having threads for fitting a bushing 23 thereon. Bushing 23 may include a quick connect/disconnect feature, allowing a hose of other source of fuel to be quickly attached to and detached from bushing 23. A connector 14 allows a hose or other source of oxidant to be connected, for example by threads or a quick connect/disconnect feature 27, to auxiliary burner embodiment 100.

Extending between fuel conduit 12 and oxidant conduit 13 are three spacers 15 spaced about 120 degree apart as illustrated in FIG. 1B. Spacers 15 provided strength to the burners, as well as help to stabilize the flame emanating from the burners.

An angle α is indicated in FIG. 1A and denotes the taper angle of tapered nozzle section 16 of fuel conduit 12. Nozzle 16 may be a separate component or may be integral with conduit 12 (the latter version is illustrated). Angle α may range from about 3 to about 45 degrees.

Figure 2:
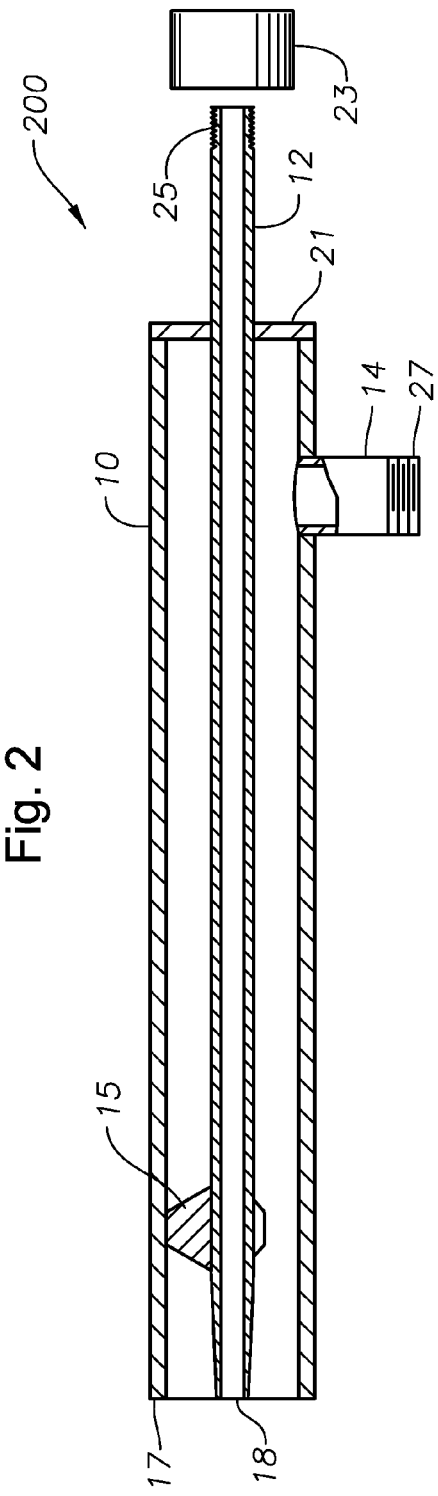
FIG. 2 is a schematic cross-sectional view of another embodiment of an auxiliary burner useful in systems and methods of this disclosure.

FIG. 2 is a schematic cross-sectional view of another embodiment 200 of an auxiliary burner useful in systems and methods of this disclosure, embodiment 200 differing from embodiment 100 only in that oxidant conduit 10 extends the entire length of burner embodiment 200. In other words, there is no small outer diameter portion 13 as in embodiment 100.

Both auxiliary burner embodiments 100 and 200 illustrated schematically in FIGS. 1 and 2 are high momentum burners.

For example, embodiment 100 may comprise a nominal ¼-inch stainless steel Schedule 40 pipe for conduit 12 and a nominal ¾-inch stainless steel Schedule 40 pipe for conduit 10 (turned down to 0.092-inch outer diameter (OD) in section 13). Nominal ¼-inch Schedule 40 pipe has an external diameter of 0.54 inch (1.37 cm) and an internal diameter of 0.36 inch (0.91 cm), while nominal ¾-inch Schedule 40 pipe has an external diameter of 1.05 inch (2.67 cm) and internal diameter of 0.82 inch (2.08 cm). Embodiment 200, a slightly higher momentum version, may comprise a nominal ⅛-inch stainless steel Schedule 40 tube for conduit 12 and a nominal ½-inch stainless steel Schedule 40 conduit for oxidant conduit 10. Nominal ⅛-inch Schedule 40 pipe has an external diameter of 0.41 inch (1.04 cm) and an internal diameter of 0.27 inch (0.69 cm), while nominal ½-inch Schedule 40 pipe has an external diameter of 0.84 inch (2.13 cm) and internal diameter of 0.62 inch (1.57 cm). The selection of conduit schedule dictates the annular distance between the OD of conduit 12 and internal diameter (ID) of conduit 10, and therefore the length of spacers 15. Connection 14 may be an inch or two (about 2.5 cm to about 5 cm) from burner cold end 21. These dimensions are merely examples, as any arrangement that produces the desired momentum and heat will be suitable, and within the skills of the skilled artisan in possession of this disclosure.

Figure 3:
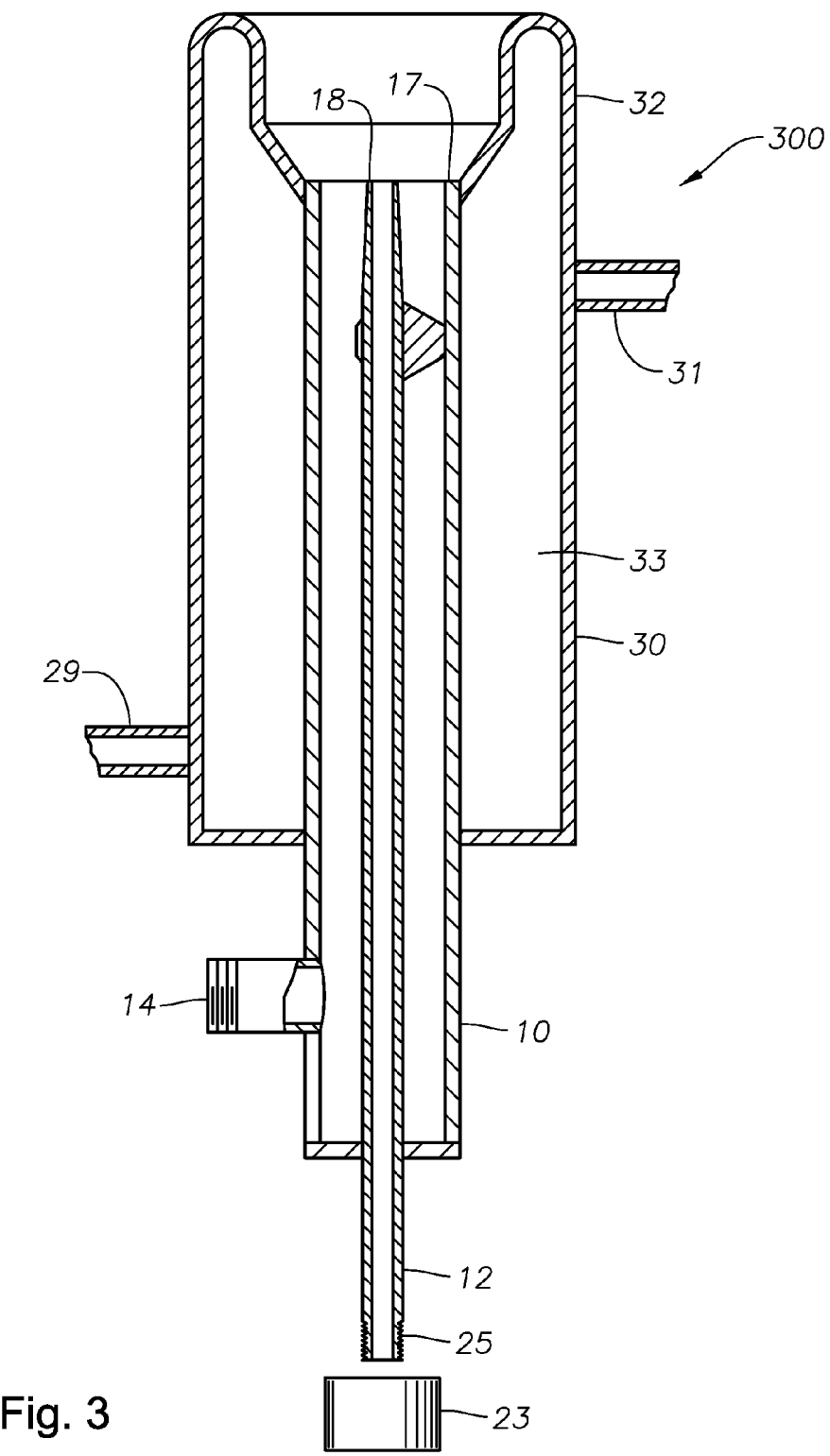
FIG. 3 is a cross-sectional view of a liquid-cooled version of the burner of FIG. 2.

FIG. 3 is a cross-sectional view of liquid-cooled embodiment 300 of auxiliary burner embodiment 200 of FIG. 2, including a third concentric conduit 30 creating an annular region 33 between oxidant conduit 10 and conduit 30. Connections 29 and 31 allow inflow and outflow, respectively of cooling fluid. Embodiment 300 further includes a burner extension 32, as more fully describe in assignee's co-pending U.S. patent application Ser. No. 13/268,028, filed Oct. 7, 2011.

Figure 4:
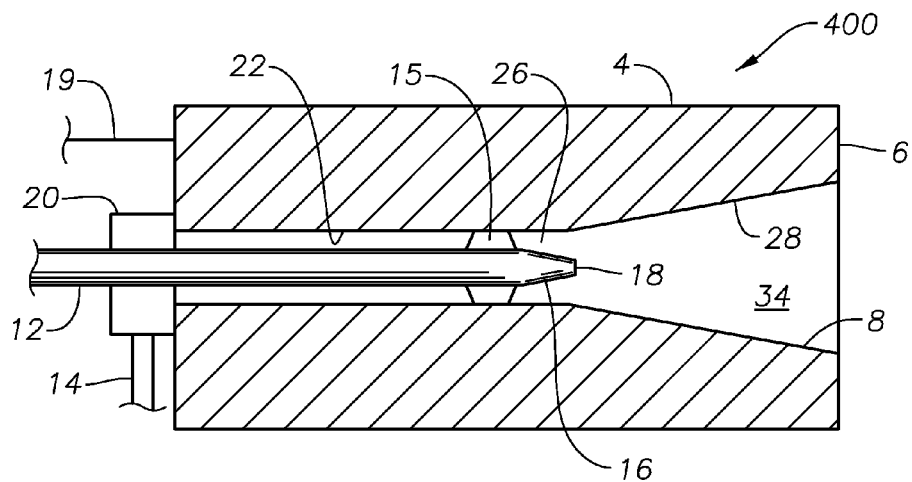
FIG. 4 is a schematic cross-sectional view of another auxiliary burner including a ceramic burner block useful in certain embodiments of systems and methods of the present disclosure.

FIG. 4 is a schematic cross-sectional view of another auxiliary burner embodiment 400 including a ceramic burner block useful in certain embodiments of systems and methods of the present disclosure. Embodiment 400 includes an oxidant conduit 14 connecting to an oxidant plenum 20. Oxidant plenum 20 routes oxidant between the OD of fuel conduit 12 and an inner surface 22 of a cavity in a ceramic burner block 4. Burner block 4 includes a hot end 6 having an exit 8 for combustion products, and includes an internal surface having a straight portion 26 and a tapered portion 28, where tapered portion 28 forms a combustion chamber 34. Straight portion 26 forms a chamber 35 (FIG. 5) in which is positioned tapered nozzle section 16 of fuel conduit 12.

Figure 5:
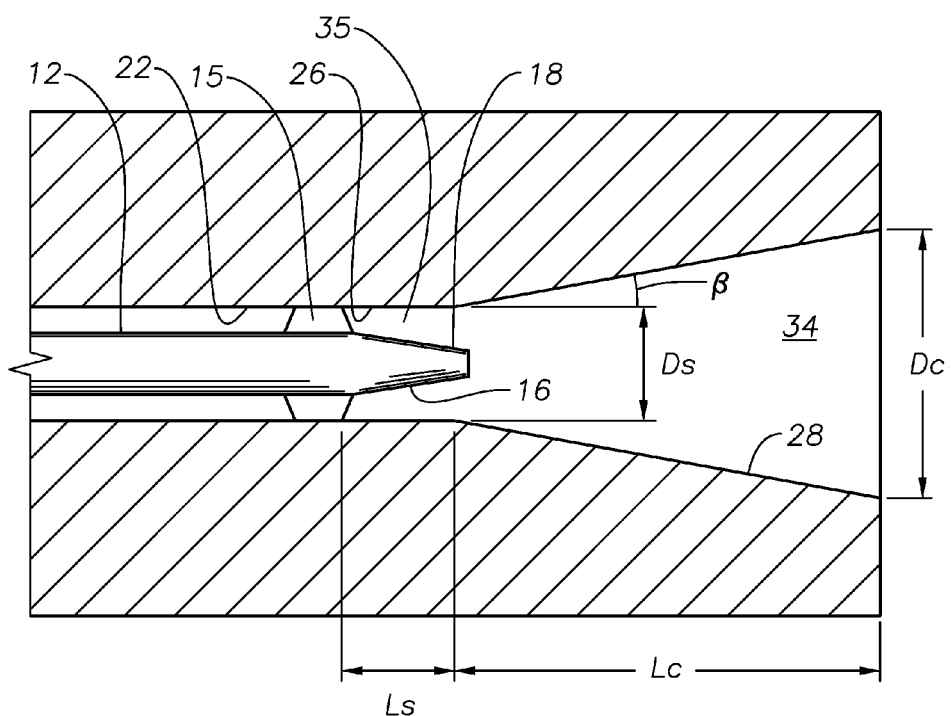
FIG. 5 is a schematic diagram of a portion of the burner of FIG. 4, illustrating certain dimensions of the burner.

FIG. 5 is a schematic diagram of a portion of the burner of FIG. 4, illustrating certain dimensions of auxiliary burner embodiment 400. Length $L_s$ is the length of chamber 35 defined by straight section 26 of inner surface 22 of the ceramic block cavity. $L_s$ may range from about 0.5 inch to about 3 inches or more (from about 1.3 cm to about 7.6 cm or more). Length $L_c$ is the length of tapered section 28 of ceramic block 4, and may range from about 5 inches to about 25 inches or more (from about 13 cm to about 64 cm or more). $D_s$ is the diameter of chamber 35, and depends on the external diameter of conduit 12, but may generally range from about 3 inches to about inches 10 inches or more (from about 7.62 cm to about 25 cm or more). $D_c$ is the diameter of chamber 34 at its exit, and may range from about 5 inches to about 25 inches or more (from about 13 cm to about 64 cm). Angle β, which is the angle of tapered section 28 of ceramic burner block 4, may range from about 3 degrees to about 45 degrees or more, depending on the amount of foam present to be moved and positioning of the auxiliary burner in the melter.

Figure 6:
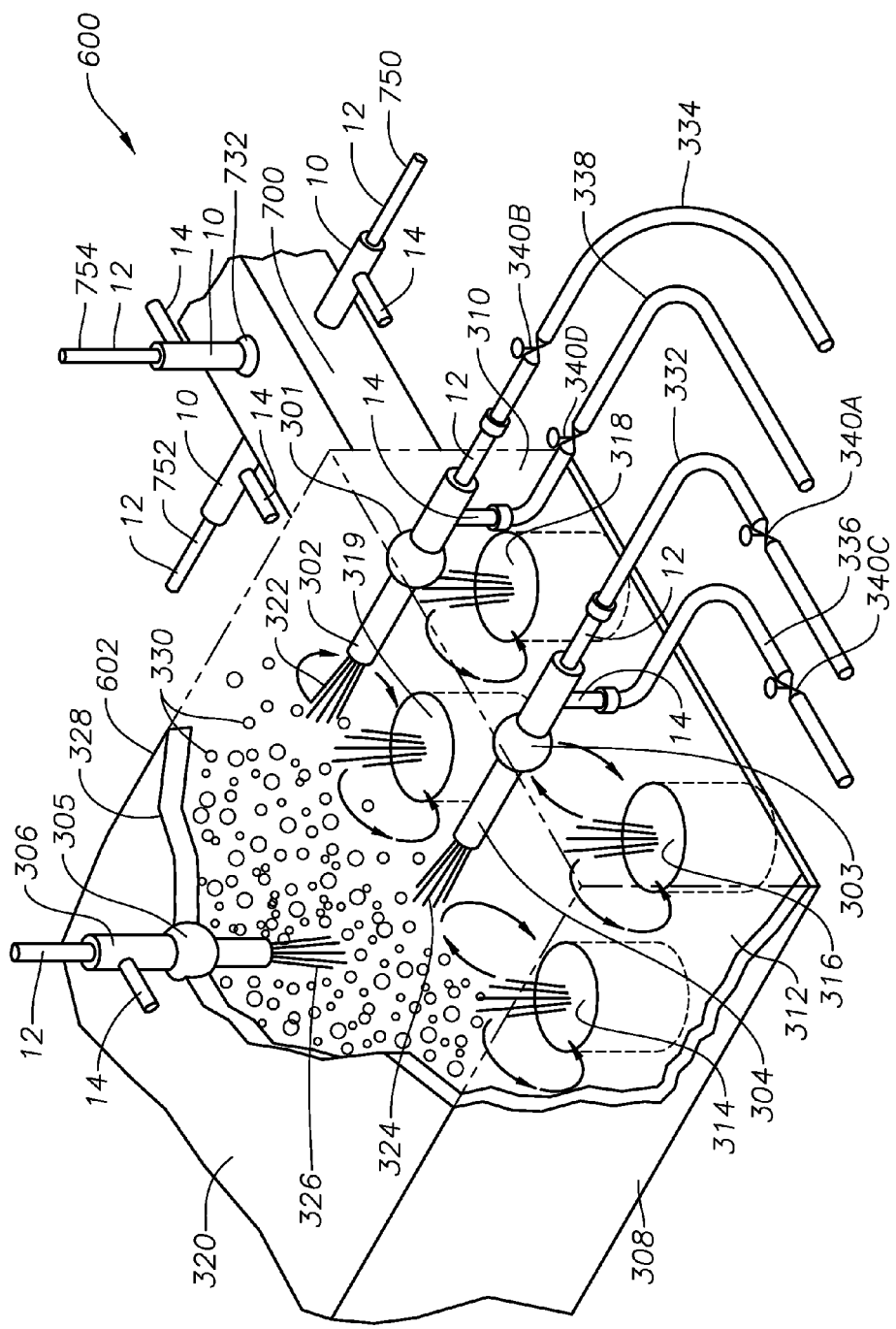
FIG. 6 is a schematic perspective view of a system embodiment of the present disclosure.

FIG. 6 is a schematic perspective view, partially in phantom, of a system embodiment 600 of the present disclosure. System embodiment 600 comprises two auxiliary burners 302, 304 mounted in ports 301, 303, respectively, in a sidewall 310 of a submerged combustion ("SC") melter 602. Also included is a third auxiliary burner 306 mounted in a port 305 in a roof 320 of SC melter 602. SC melter 602 further includes a feed end wall 308, floor 312 through which are mounted four SC burners 314, 316, 318, and 319. The four SC burners in this embodiment are positioned in a square pattern. Burners 314, 316, 318, and 319 are shown partially in phantom as their bodies are under SC melter floor 312.

Roof 320 is illustrated schematically as having a cut-out portion 328, making it possible to view the internals of SC melter 602. In accordance with embodiments of the present disclosure, flame and/or combustion products 322, 324 from sidewall-mounted auxiliary wall burners 302, 304, and flame and/or combustion products 326 from roof-mounted auxiliary burner 306 are shown impinging on and either bursting some of the bubbles in a layer of bubbles 330, and/or heating the bubble layer sufficiently to burst at least some of the bubbles. The film forming the outside surfaces of the bubbles, formed as they are from liquefied glass-forming materials, then flows back into the bulk of the molten material. It should be noted that embodiment 600 is merely illustrative, and that certain embodiments may have only one auxiliary burner, for example only auxiliary burner 302, or only auxiliary burner 306.

Also illustrated in FIG. 6 are fuel supply conduits 332, 334, and oxidant supply conduits 336, 338, as well as respective flow control valves 340A-D. Conduits 332, 334, 336, and 338 may connect to their respective burner conduits via threaded fittings, quick connect/disconnect fittings, hose fittings, and the like.

Figure 7:
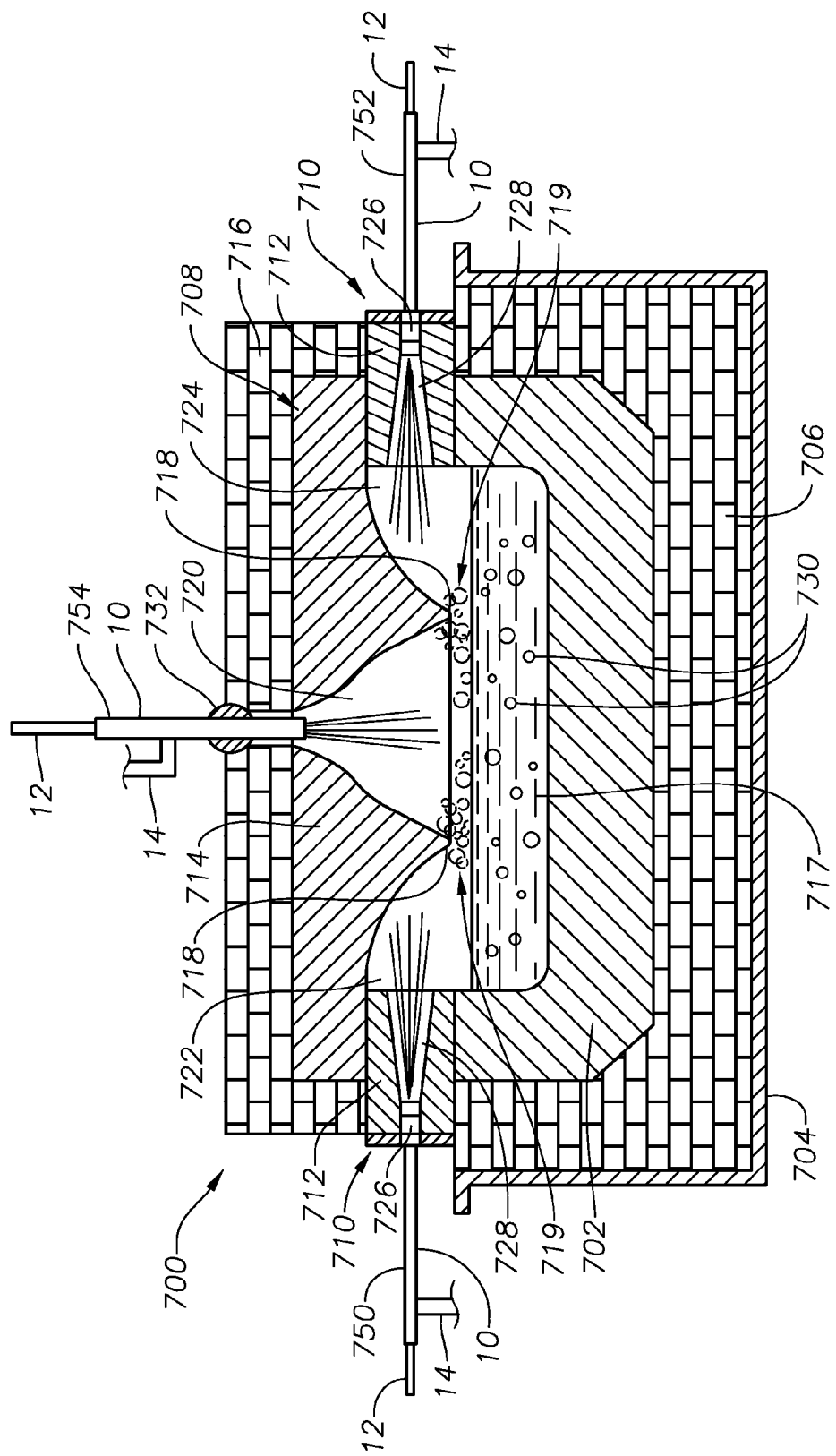
FIG. 7 is a schematic perspective view of another system embodiment of the present disclosure.

Another feature of systems and methods of the present disclosure is illustrated schematically in FIG. 6 and more particularly FIG. 7. The molten glass produced in SC melter 602 may produce a reduced foam molten glass that exits into a downstream component 700, which may be a distribution channel, conditioning channel, forehearth, or other channel. As the perspective view of FIG. 6 illustrates, and the cross-sectional view of FIG. 7 further illustrates, three auxiliary burners are illustrated in downstream component 700, comprising two sidewall auxiliary burners 750, 752, and a third roof-mounted auxiliary burner 754. It should be noted that only one auxiliary burner may be needed in certain embodiments. Auxiliary burners 750, 752 are not illustrated as being position adjustable, although they could be. Auxiliary burner 754 is illustrated as position adjustable through a port 755, but in certain other embodiments it may not be so.

Referring more particularly to FIG. 7, forehearth 700 may include a generally U-shaped channel or trough 702 of refractory material supported by a metallic superstructure 704. Trough 702 sits upon and is surrounded by insulating bricks 706 which are in turn supported by metallic superstructure 704. A roof portion 708 covers channel or trough 702 and includes opposed sides 710 formed by burner blocks 712 and roof blocks 714 extending over trough 702 between opposed burner blocks 712. Insulating bricks 716 may be provided about the outer periphery of roof blocks 714. Molten glass 717 of reduce foam content flows along trough 702 as shown. Roof block 714 may include two spaced projections 718 which extend downward toward the reduced foam molten glass 717 below the centerline of the burner blocks. Spaced projections 718 form a central channel 720 over the central portion of the stream of molten glass 717 and side channels 722 and 724 over respective side portions of the reduced foam molten glass stream. As is typical in forehearth design, cooling air may be provided along central channel 720.

Auxiliary burners 750 and 752 are mounted in burner blocks 712 with the forward end 726 of each burner extending into an aperture 728 in each burner block 712. Quick disconnects (not illustrated in FIG. 7) for oxidant and fuel streams may be provided for each burner 750, 752 and positioned outside its respective burner block 712 to enable the fuel lines and oxidant lines to be attached thereto. Bubbles 730 remaining in molten glass may rise in the molten glass and help to produce or maintain a foam layer 719, or foam layer 719 might be in part left over from the SC melter 602 (FIG. 6). In any case, in embodiment 700 auxiliary burners 750, 752 serve to push foam layer 719 toward projections 718, and may provide flame that extends into side channels 722, 724 to heat the outer portions of the molten glass stream. Roof-mounted auxiliary burner 754 is illustrated schematically as mounted via an adjustable mount 732, such as a ceramic-lined ball turret, in roof 708, and causes its combustion products to impinge on the "stacked up" foam layer 719 and burst at least some of the bubbles in foam layer 719 through heat and/or hitting the foam bubbles directly.

It should be understood that embodiment 700 is only one example of many possible downstream components and channel shapes. Suitable shaped channel or trough 702 of refractory material may have any longitudinal shape (straight, L-shaped, curved, for example S-shaped), and may have one or more parallel and/or series arranged regions. Trough 702 may have any lateral (cross-sectional) shape, such as rectangular, oval, round, V-shaped, U-shaped, and the like. Depth of trough 702 may vary, but exemplary embodiments may have a depth that is commensurate with SC melter depth, and such that the foamy molten glass will be able to move into the trough. The cross-sectional shape may be the same or different along the length of the trough.

The flow rate of the foamy or reduced foam molten glass through trough 702 will in turn depend on many factors, including the dimensions of trough 702, size of SC melter 602, whether or not there is a weir or like device (such as a skimmer hanging from a roof of trough 702), temperature of the melts, viscosity of the melts, and like parameters, but in general the flow rate of molten glass in trough 702 may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Figure 8:
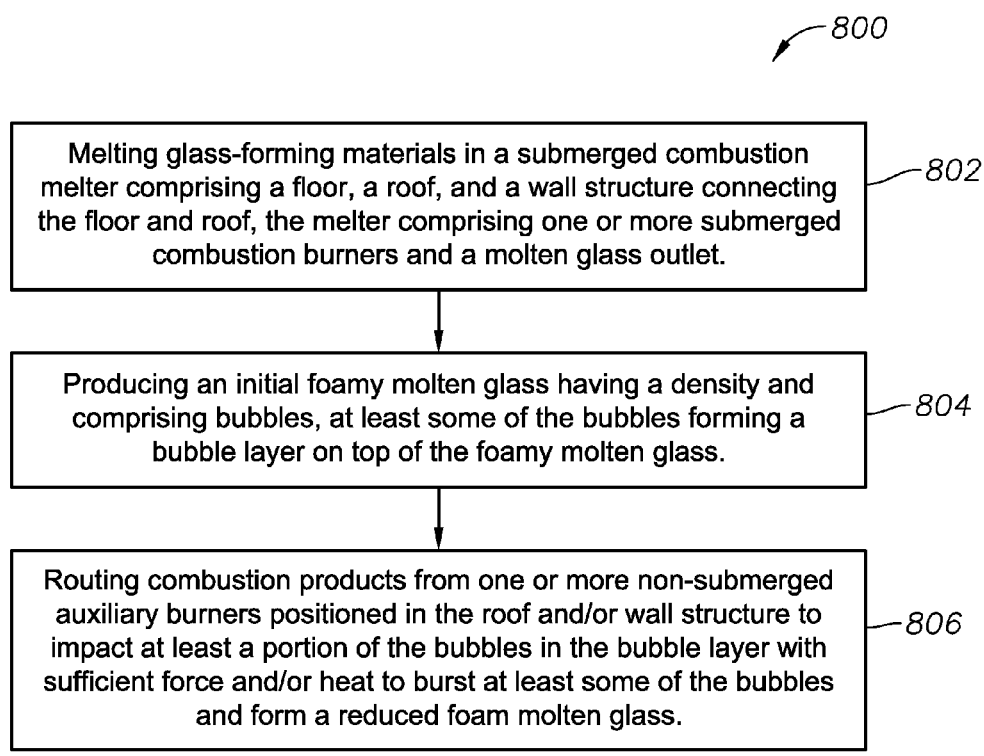
FIGS. 8, 9, and 10 are logic diagrams of three method embodiments of the present disclosure.
Figure 9:
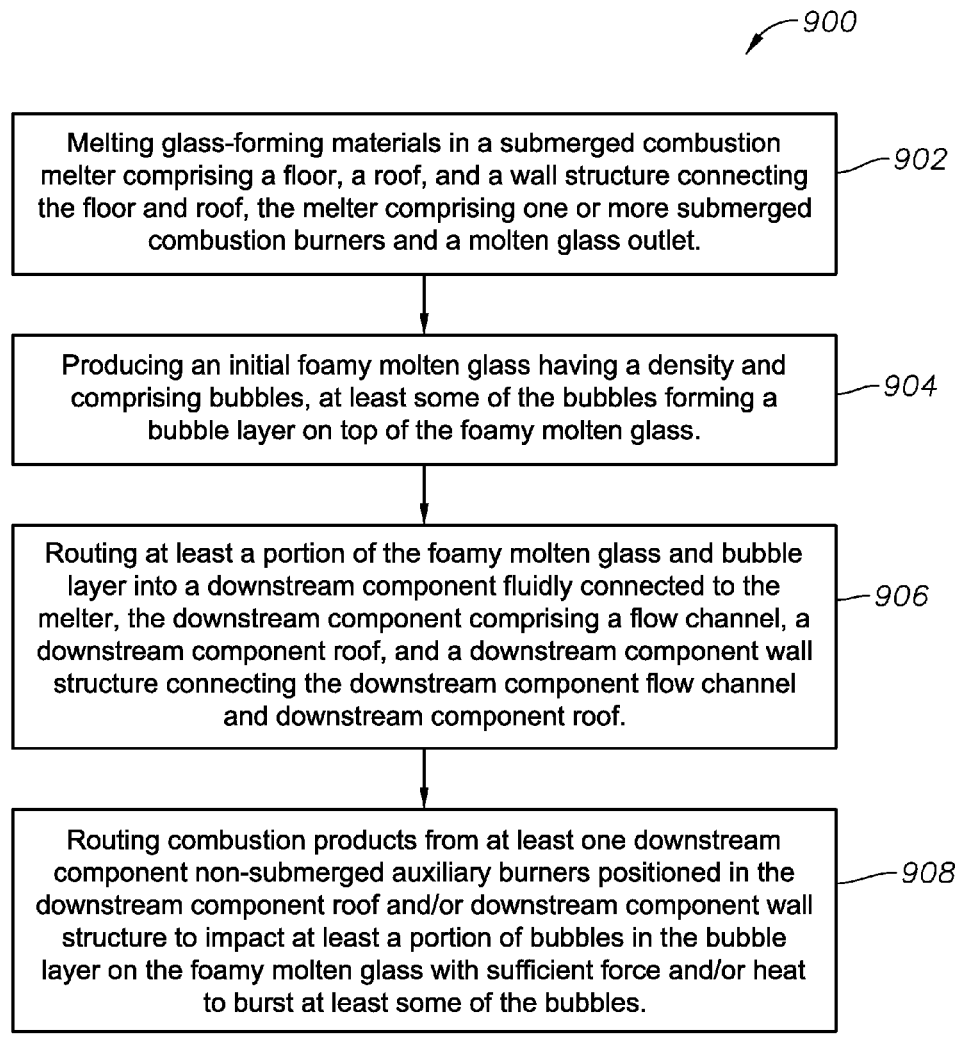
Figure 10:
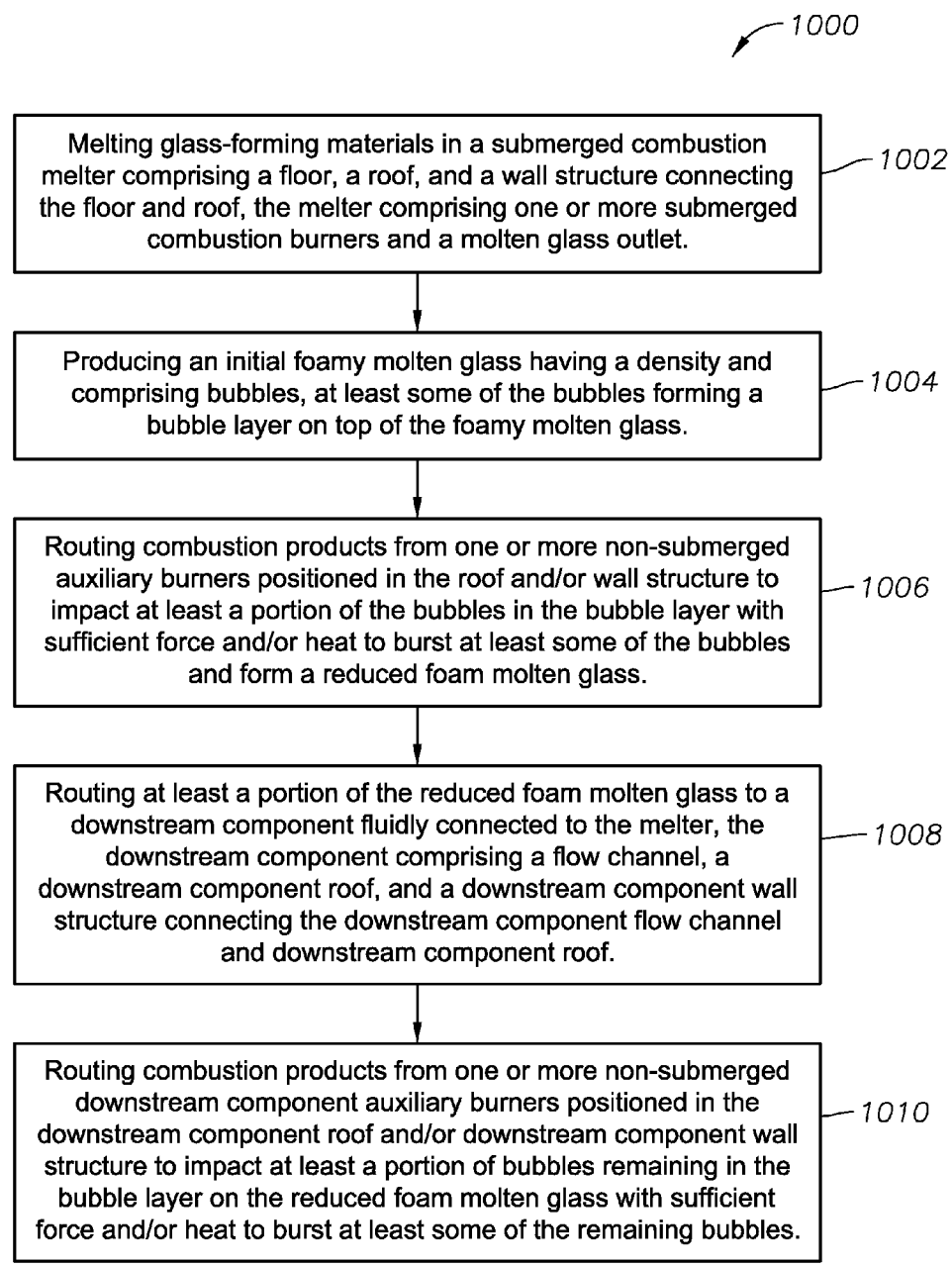

FIGS. 8-10 are logic diagrams of four method embodiments of the present disclosure. FIG. 8 is a logic diagram of method embodiment 800, including the steps of melting glass-forming materials in a submerged combustion melter comprising a floor, a roof, and a wall structure connecting the floor and roof, the melter comprising one or more submerged combustion burners and a molten glass outlet (box 802); producing an initial foamy molten glass having a density and comprising bubbles, at least some of the bubbles forming a bubble layer on top of the foamy molten glass (box 804); and routing combustion products from one or more non-submerged auxiliary burners positioned in the roof and/or wall structure to impact at least a portion of the bubbles in the bubble layer with sufficient force and/or heat to burst at least some of the bubbles and form a reduced foam molten glass, (box 806).

FIG. 9 is a logic diagram of method embodiment 900, which comprises the steps of melting glass-forming materials in a submerged combustion melter comprising a floor, a roof, and a wall structure connecting the floor and roof, the melter comprising one or more submerged combustion burners and a molten glass outlet, (box 902); producing an initial foamy molten glass having a density and comprising bubbles, at least some of the bubbles forming a bubble layer on top of the foamy molten glass, (box 904); routing at least a portion of the foamy molten glass and bubble layer into a downstream component fluidly connected to the melter, the downstream component comprising a flow channel, a downstream component roof, and a downstream component wall structure connecting the downstream component flow channel and downstream component roof, (box 906); and routing combustion products from at least one downstream component non-submerged auxiliary burner positioned in the downstream component roof and/or downstream component wall structure to impact at least a portion of bubbles in the bubble layer on the foamy molten glass with sufficient force and/or heat to burst at least some of the bubbles, (box 908).

FIG. 10 is a logic diagram of method embodiment 1000, which is a method comprising the steps of melting glass-forming materials in a submerged combustion melter comprising a floor, a roof, and a wall structure connecting the floor and roof, the melter comprising one or more submerged combustion burners and a molten glass outlet, (box 1002); producing an initial foamy molten glass having a density and comprising bubbles, at least some of the bubbles forming a bubble layer on top of the foamy molten glass, (box 1004); routing combustion products from one or more non-submerged auxiliary burners positioned in the roof and/or wall structure to impact at least a portion of the bubbles in the bubble layer with sufficient force and/or heat to burst at least some of the bubbles and form a reduced foam molten glass, (box 1006); routing at least a portion of the reduced foam molten glass to a downstream component fluidly connected to the melter, the downstream component comprising a flow channel, a downstream component roof, and a downstream component wall structure connecting the downstream component flow channel and downstream component roof, (box 1008), and routing combustion products from one or more non-submerged downstream component auxiliary burners positioned in the downstream component roof and/or downstream component wall structure to impact at least a portion of bubbles remaining in the bubble layer on the reduced foam molten glass with sufficient force and/or heat to burst at least some of the remaining bubbles, (box 1010).

Submerged combustion melter 602 in embodiments described herein may be any of the currently known submerged combustion melter designs, or may be one of those described in assignee's currently pending patent application Ser. No. 12/817,754, filed Jun. 17, 2010, incorporated herein by reference. Submerged combustion melters useful in the practice of the methods and apparatus of this description may take any number of forms, including those described in assignee's co-pending application Ser. No. 12/817,754, which describes sidewalls forming an expanding melting zone formed by a first trapezoidal region, and a narrowing melting zone formed by a second trapezoidal region, wherein a common base between the trapezoid defines the location of the maximum width of the melter. Submerged combustion melter 602 may include a roof, side walls, a floor or bottom, one or more submerged combustion burners, an exhaust chute, one or more molten glass outlets, and optionally fluid-cooled panels comprising some or all of the side walls. Submerged combustion melter 602 is typically supported on a plant floor.

Submerged combustion melter 602 may be fed a variety of feed materials by one or more roll stands, which in turn supports one or more rolls of glass mat, as described in assignee's co-pending U.S. application Ser. No. 12/888,970, filed Sep. 23, 2010, incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass hatch feeder. Glass batch feeders are well-known in this art and require no further explanation. Certain embodiments may comprise a process control scheme for the submerged combustion melter and burners. For example, as explained in the '970 application, a master process controller may be configured to provide any number of control logics, including feedback control, feedforward control, cascade control, and the like. The disclosure is not limited to a single master process controller, as any combination of controllers could be used. The term "control", used as a transitive verb, means to verify or regulate by comparing with a standard or desired value. Control way be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application Ser. No. 13/268, 065, filed Oct. 7, 2011, using the vibrations and oscillations of the melter itself, may prove useful predictive control inputs.

Those having ordinary skill in this art will appreciate that there are many possible variations of the melter, channels, troughs, burners, and adjustment mechanisms to adjust combustion product direction described herein, and will be able to devise alternatives and improvements to those described herein that are nevertheless considered to be within the claims of the present patent.

Submerged combustion burners useful in the SC melter apparatus described herein include those described in U.S. Pat. Nos. 4,539,034; 3,170,781; 3,237,929; 3,260,587; 3,606, 825; 3,627,504; 3,738,792; 3,764,287; and 7,273,583, and assignee's co-pending patent application Ser. No. 13/268, 028, filed Oct. 7, 2011. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process hi bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

In certain embodiments the SC burners may be floor-mounted burners. In certain embodiments, the SC burners may be positioned in rows substantially perpendicular to the longitudinal axis (in the melt flow direction) of melter 602. In certain embodiments, the SC burners may be positioned to emit combustion products into molten glass in a melting zone of melter 6022 in a fashion so that the gases penetrate the melt generally perpendicularly to the floor. In other embodiments, one or more burners may emit combustion products into the melt at an angle to the floor, as taught in assignee's pending Ser. No. 12/817,754.

Submerged combustion melters useful in systems and methods in accordance with the present disclosure may also comprise one or more wall-mounted submerged combustion burners, and/or one or more roof-mounted (non-auxiliary) burners. Roof-mounted burners may be useful to pre-heat the melter apparatus melting zone, and serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, all submerged combustion burners are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, and in the lehr. In certain embodiments the oxy-fuel burners may comprise one or more submerged combustion burners each having co-axial fuel and oxidant tubes forming an annular space there between, wherein the outer tube extends beyond the end of the inner tube, as taught in U.S. Pat. No. 7,273,583, incorporated herein by reference. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of melter 602 having constant width, extending from a first trapezoidal region to the beginning of a narrowing melting region. Other embodiments of suitable melters are described in the above-mentioned '754 application.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

The refractory or refractory-lined channels or troughs described in accordance with the present disclosure may be constructed using refractory cooled panels. Both the melter and trough floors and side walls may include a thin refractory lining, as discussed herein. The thin refractory coating may be 1 centimeter, 2 centimeters, 3 centimeters or more in thickness, however, greater thickness may entail more expense without resultant greater benefit. The refractory lining may be one or multiple layers. Alternatively, melters and channels described herein may be constructed using cast concretes such as disclosed in U.S. Pat. No. 4,323,718. The thin refractory linings discussed herein may comprise materials described in the 718 patent. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

The total quantities of fuel and oxidant used by the SC burners in systems of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various SC burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

For auxiliary burners burning natural gas, the auxiliary burners may have a fuel firing rate ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the auxiliary burner would have a combustion ration of 2.05:1; a velocity ratio of 1; firing rate of natural gas of 500 scfh (14,000 L·hr.) and 1075 scfh (30,400 L/hr.) oxygen; natural gas and oxygen velocities each of 270 ft./sec (80 m/sec);

natural gas pressure of 1 psig (6.9 KPa); and oxygen pressure of 0.6 psig (4.1 Kpa), pressures measured at the entrance to the combustion chamber.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A system comprising:
   a submerged combustion melter comprising a floor, a roof, and a wall structure connecting the floor and roof, the wall structure comprising a feed end wall, a discharge end wall opposite the feed end wall, and first and second side walls connecting the feed end wall and the discharge end wall, the melter comprising one or more submerged combustion burners positioned in the floor to discharge combustion products vertically upward, and a molten glass outlet positioned in the discharged end wall; and
   one or more substantially vertical roof-mounted non-submerged auxiliary burners positioned in the roof to discharge combustion products substantially vertically downward, and two or more wall-mounted non-submerged auxiliary burners positioned in the first side wall to discharge combustion products substantially horizontally and substantially perpendicularly toward the second side wall, the one or more substantially vertical roof-mounted non-submerged burners positioned offset horizontally between the second side wall and a vertical line through a centerline of the one or more submerged combustion burners that is positioned furthest from the first side wall.

2. The system of claim 1 wherein one or more of the non-submerged burners are liquid-cooled pipe-in-pipe burners.

3. The system of claim 2 wherein the pipe-in-pipe burner comprises a first conduit and a second conduit concentric with and outside of the first conduit, the first conduit fluidly connected at one end to a source of fuel, and the second conduit fluidly connected to a source of oxidant.

4. The system of claim 1 wherein the two or more wall-mounted non-submerged auxiliary burners comprise a fuel inlet conduit having an exit nozzle, the conduit and nozzle inserted into a cavity of a ceramic burner block, the ceramic burner block in turn inserted into the first side wall.

5. The system of claim 1 wherein one or more of the non-submerged auxiliary burners is adjustable with respect to direction of flow of the combustion products.

6. The system of claim 1 comprising a downstream component fluidly connected to the melter, the downstream component comprising a flow channel, a downstream component roof, and a downstream component wall structure connecting the flow channel and downstream component roof.

7. The system of claim 6 wherein the downstream component comprises one or more non-submerged downstream component auxiliary burners positioned in the downstream component roof and/or downstream component wall structure.

8. The system of claim 7 wherein at least one of the downstream component auxiliary burners is adjustable with respect to direction of flow of the combustion products from the downstream component auxiliary burner.

9. The system of claim 7 wherein the downstream component auxiliary burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

10. The system of claim 6 wherein the downstream component is selected from the group consisting of a distribution channel, a conditioning channel, and a forehearth.

11. The system of claim 1 wherein the auxiliary burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

12. A system comprising:
   a submerged combustion melter comprising a floor, a roof, and a wall structure connecting the floor and roof, the wall structure comprising a feed end wall, a discharge end wall opposite the feed end wall, and first and second side walls connecting the feed end wall and the discharge end wall, the melter comprising one or more submerged combustion burners positioned in the floor to discharge combustion products vertically upward, and a molten glass outlet positioned in the discharged end wall;
   one or more substantially vertical roof-mounted non-submerged auxiliary burners positioned in the roof to discharge combustion products substantially vertically downward, and two or more wall-mounted non-submerged auxiliary burners positioned in the first side wall to discharge combustion products substantially horizontally and substantially perpendicularly toward the second side wall, the one or more substantially vertical roof-mounted non-submerged burners positioned offset horizontally between the second side wall and a vertical line through a centerline of the one or more submerged combustion burners that is positioned furthest from the first side wall; and
   a downstream component fluidly connected to the melter, the downstream component comprising a flow channel, a downstream component roof, and a downstream component wall structure connecting the downstream component flow channel and downstream component roof, the downstream component comprising one or more non-submerged downstream component auxiliary burners positioned in the downstream component roof but not in the downstream component wall structure.

* * * * *